Jan. 10, 1961   R. F. ROBERSON   2,967,725
RAM MOUNTING FOR IMPLEMENTS
Filed Oct. 7, 1957   2 Sheets-Sheet 1
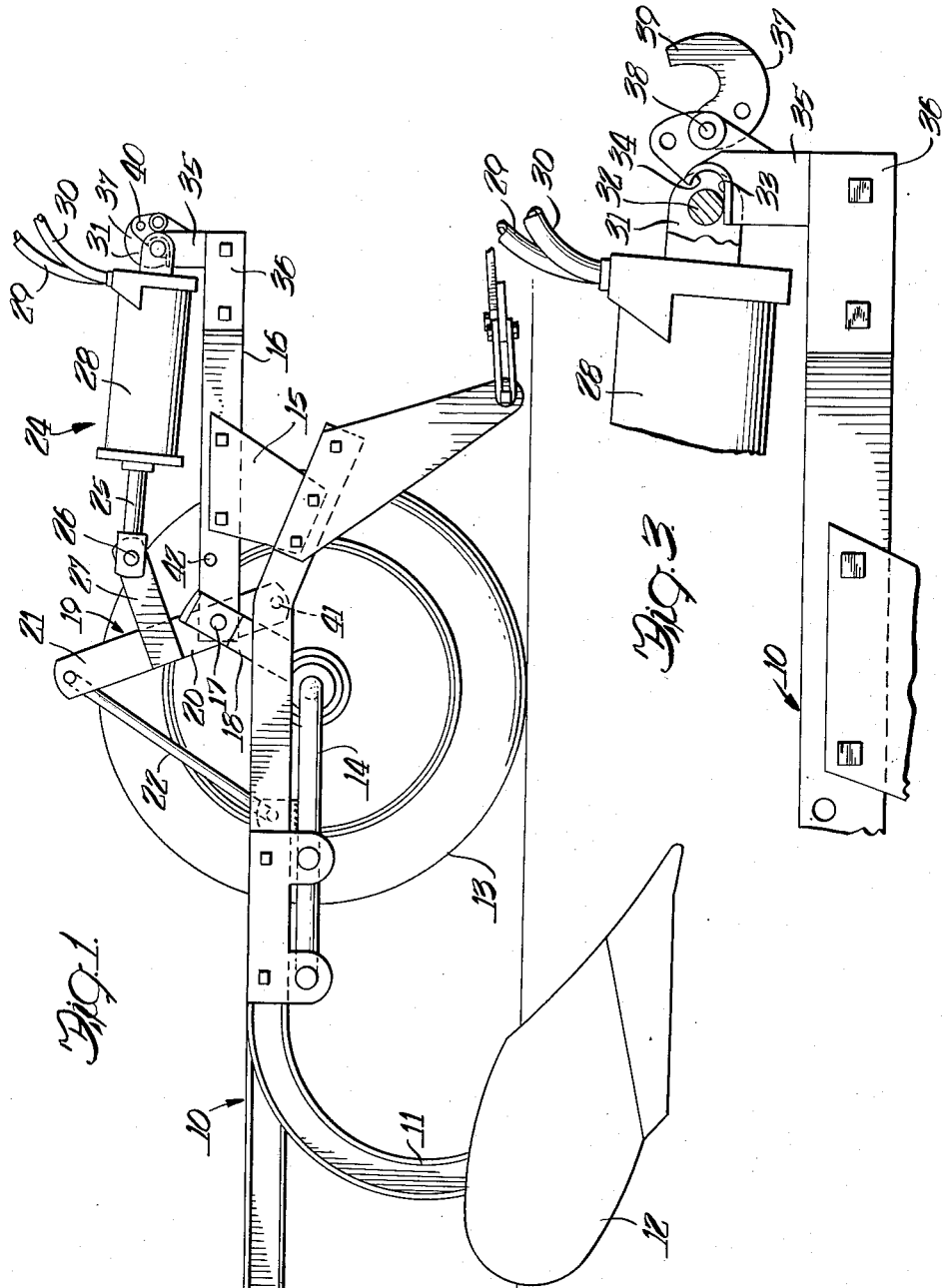
INVENTOR
Raymond F. Roberson
Paul O. Pippel
ATTORNEY

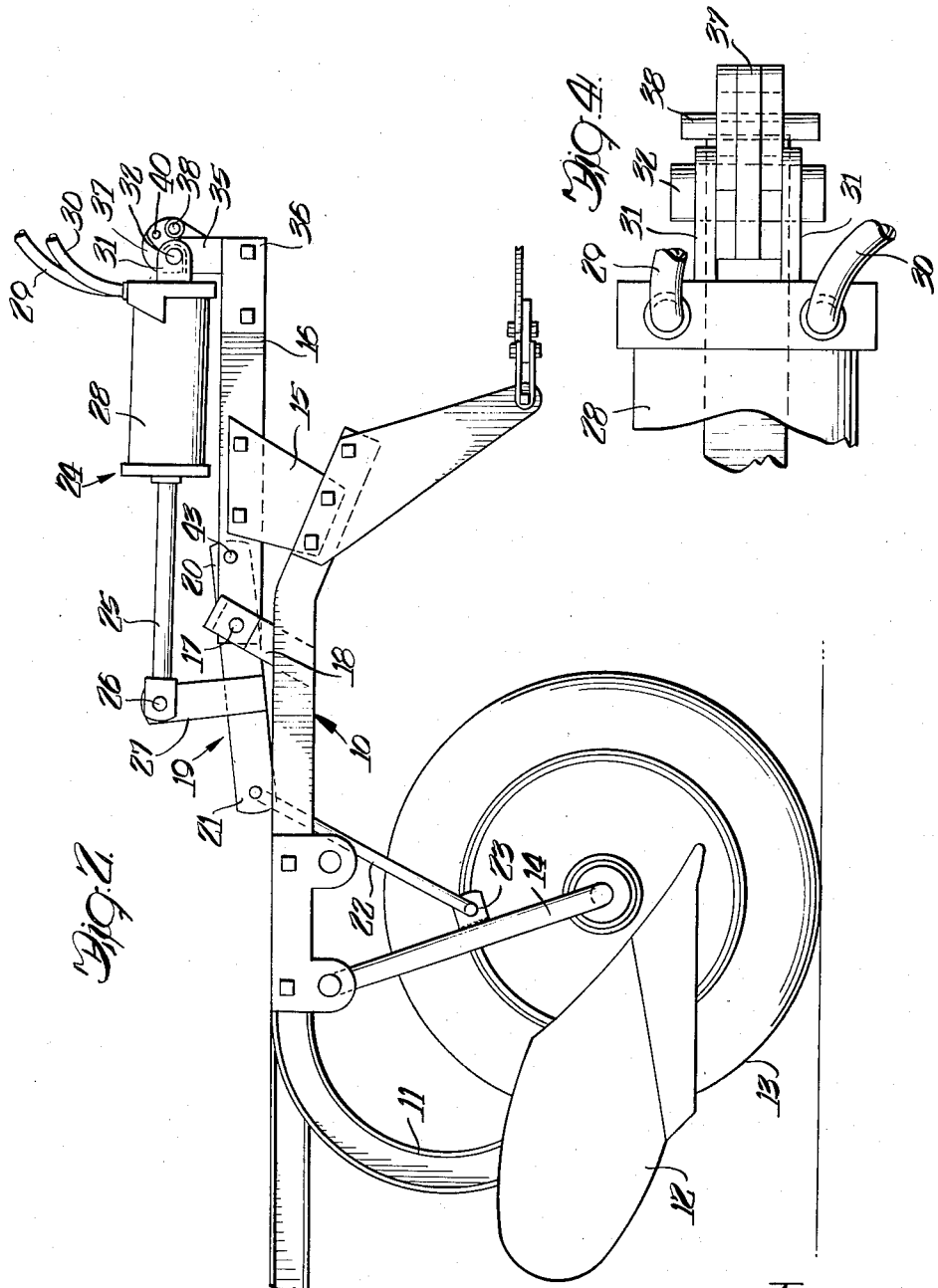

United States Patent Office 2,967,725
Patented Jan. 10, 1961

---

2,967,725

RAM MOUNTING FOR IMPLEMENTS

Raymond F. Roberson, Canton, Ill., assignor to International Harvester Company, Chicago, Ill., a corporation of New Jersey Filed Oct. 7, 1957, Ser. No. 688,573

4 Claims. (Cl. 287—95)

This invention relates to control means for implements and particularly to agricultural implements. More specifically, the invention concerns an implement of the trailing type and novel means for mounting a hydraulic ram thereon.

Modern farming practice entails the use of implements of various kinds, and it is customary for a farmer or other operator to utilize a single hydraulic ram or the like which he can shift from one implement to another as needed. For instance, a farmer owning both a moldboard plow and a disk harrow, uses a single hydraulic ram for raising and lowering the implements, removing the ram from the plow, transferring it to the harrow and returning it to the plow as needed. Since the mounting parts on the plow and harrow are usually different in spacing, the transfer of the ram from one implement to the other requires trial and error adjustment of the position of the piston rod in the cylinder to fit the ram exactly to the mounting parts.

The present invention has for its object the provision of improved means for mounting a power unit on an implement.

Another object of the invention is the provision of novel means for mounting a hydraulic ram or the like on an implement wherein allowance is made for substantial variation between the length of the ram when removed from one implement and the space between the mounting parts of another implement to which the ram is to be transferred.

Another object of the invention is the provision, in an implement having a movable part and a stationary part, of improved means for mounting thereon a hydraulic cylinder and piston unit whereby the connecting points on the cylinder and piston rod are readily adaptable to the spacing between the connecting parts on the implement for moving the movable part by operation of the cylinder and piston unit.

Other objects and advantages of the invention will become clear from the following detailed description when read in conjunction with the accompanying drawings wherein:

Figure 1 is a side elevation, with parts removed, of a part of a moldboard plow frame having ram mounting means thereon incorporating the features of this invention, and illustrating the position of the parts when the implement is in its operating position;

Figure 2 is a view similar to Figure 1 showing the relationship of parts when the implement is in its transport position;

Figure 3 is a partial enlarged view in side elevation showing the cylinder end of the ram in the process of mounting the hydraulic ram on the plow frame; and Figure 4 is an enlarged detail showing a portion of the structure of Figure 2 in a plan view.

The plow with which this invention is concerned is a moldboard plow adapted to be drawn in trailing relation behind a tractive vehicle having a power plant and a source of fluid under pressure, none of which is shown.

The plow of this invention is of conventional construction and only a portion thereof is shown comprising a supporting frame 10 including one or more downwardly and forwardly curved plow beams 11 each carrying at its lower end a plow bottom 12. One or more supporting wheels 13, only one of which is shown, are provided and are mounted upon the plow frame 10 through the intermediary of a crank axle 14 for swinging in a vertical plane from the position shown in Figure 1 with the plow bottom in operation, to the position of Figure 2 with the plow bottoms and the frame elevated above the ground for transport purposes.

A plate 15 affixed to and extending upwardly from the forward end of frame 10 has secured thereto a horizontal longitudinally extending ram supporting bracket 16, the rear end of which extends beyond plate 15 and is connected by a pin 17 to a lug 18 affixed to the frame 10 and projecting upwardly therefrom.

A bell crank 19 is provided with an arm 20 pivotally mounted upon the pin 17 to provide a fulcrum for the bell crank, and another arm 21 of the bell crank is connected by a lifting link 22 with a lug 23 affixed to the crank axle 14 carrying wheel 13. Thus rocking of bell crank 19 about its fulcrum 17 vertically moves the implement frame 10 between the operating and transport positions indicated in Figures 1 and 2. This is accomplished by means of a power unit comprising a hydraulic ram 24 including a piston rod 25 pivotally connected by a pin 26 with the upper end of another arm 27 of bell crank 19.

Piston rod 25 is slidably receivable in a cylinder 28 adapted to receive fluid under pressure from a source, not shown, through hose lines 29 and 30 to extend and retract the piston rod 25 therein. The forward end of the cylinder 28 is provided with a clevis comprising laterally spaced lugs 31 in which is carried a transverse pivot pin 32 adapted to rest upon a generally horizontal ledge 33 terminating in a stop in the form of a recess or hook 34 formed at the upper end of the upright arm 35 of a bracket 36 affixed to the forward end of support 16.

Pin 32 is locked in recess or hook 34 by means of a latch member 37 pivotally connected at 38 to the upper end of arm 35 forwardly of the recess 34 and being curved in the manner shown in the drawing and provided with a hook portion 39 adapted to be swung into locking position between lugs 31 as shown in Figures 1, 2 and 4 with the hook portion 39 engaging the side of pin 32 opposite the recess 34. Latch 37 is locked in position by a removable pin 40 passing through the latch and the upper end of arm 35.

When it is desired to remove the ram unit 24 from the implement, the piston rod 25 is fully extended, at which point an opening 41 in the end of arm 20 remote from fulcrum 17 lines up with an opening 42 in the supporting bar 16 to receive a pin 43, preferably a shear pin.

To facilitate insertion of the locking pin, one of the openings, such as opening 42 in the bar 16 is made somewhat larger than the opening 41.

Upon removal of pin 40 holding latch 37, the latter may be pivoted forwardly about the axis 38 and out of latching relation with respect to pin 32. Upon removal of pin 26 the ram unit 24 can be removed, if desired, for use upon another implement.

If we assume that the ram unit 24 is to be used upon some other implement before returning it to the plow, it is likely that the position of the piston rod 25 in the cylinder 28 is somewhat different so that the openings in the end of piston rod 25 and arm 27 do not register when pin 32 at the end of cylinder 28 is inserted in the hook 34. Therefore, the connection is first made between the rod 25 and arm 27, and if we assume that pin 32 falls short of abutting stop 34, for example resting upon the ledge 33 at a location such as shown in Figure 3, the operator of the tractor by which the implement is propelled manipulates the valve controls for supplying fluid under pressure to the ram to extend it until the pin 32 engages the stop. The latch 37, which has been swung about its pivot to the inoperative position shown in Figure 3 is then returned to latched position. The hold-up pin 43 can then be removed from the registering openings 41 and 42 and the implement will be held in its transport position or the ram operated to lower the implement to operating position.

It is preferable that transport pin 43 be capable of shearing under load to avoid damage to the other implement parts should the ram 24 be accidentally extended or retracted while the pin is in place. However, pin 43 may also serve a double purpose and be utilized to lock latch 37 to the bracket 36 instead of using a separate pin 40.

It is believed that the construction and operation of the novel cylinder mounting for implements described hereinabove should now be clearly understood. It should also be understood, however, that the invention has been described only in its preferred embodiment and that modifications may be made therein without departing from the spirit of the invention or the scope of the appended claims.

In the claims:

1. In an implement including an extensible and retractable hydraulic ram anchored at one end to the implement, means connecting the other end of the ram to the implement, comprising a stationary part on the implement having a generally horizontal portion adapted to slidably support said other end of the ram upon operation thereof, said horizontal portion being of sufficient length to accommodate sliding movement of said other end of the ram relative thereto, a stop on said stationary part engageable by said other end of the ram after a predetermined extension thereof to react thereagainst, and releasable latch means carried by the stationary part operative to lock said other end of the ram to the implement upon engagement thereof with said stop.

2. The invention set forth in claim 1, wherein said other end of the ram is provided with a transverse pivot pin adapted to rest upon the generally horizontal portion of said stationary part and to engage said stop, and wherein said latch means releasably engages said pin.

3. The invention set forth in claim 2, wherein said latch means includes a hook-like member pivotally mounted on said stationary part and swingable to and from a position with said pin confined between said stop and said hook.

4. The invention set forth in claim 3, wherein means are provided for optionally locking said hook-like latch member to the implement.

References Cited in the file of this patent

UNITED STATES PATENTS

| | | |
|---|---|---|
| 1,398,547 | Graham | Nov. 29, 1921 |
| 1,816,206 | Booth | July 28, 1931 |
| 2,319,492 | Dewey | May 18, 1943 |
| 2,330,304 | Mott | Sept. 28, 1943 |
| 2,616,351 | Silver et al. | Nov. 4, 1952 |
| 2,620,717 | Silver et al. | Dec. 9, 1952 |
| 2,638,044 | Toland | May 12, 1953 |
| 2,654,302 | Starr | Oct. 6, 1953 |
| 2,670,672 | Markel | Mar. 2, 1954 |